United States Patent
Wincze

(10) Patent No.: US 9,322,550 B2
(45) Date of Patent: Apr. 26, 2016

(54) WATER SEAL AT BACKPASS ECONOMIZER GAS OUTLET

(75) Inventor: Steven P. Wincze, Canton, CT (US)

(73) Assignee: ALSTOM TECHNOLOGY LTD (CH)

( * ) Notice: Subject to any disclaimer, the term of this patent is extended or adjusted under 35 U.S.C. 154(b) by 860 days.

(21) Appl. No.: 13/461,019

(22) Filed: May 1, 2012

(65) Prior Publication Data

US 2013/0291856 A1 Nov. 7, 2013

(51) Int. Cl.
  *F23J 13/04* (2006.01)
  *F23J 11/00* (2006.01)
  *F23L 15/04* (2006.01)

(52) U.S. Cl.
  CPC ............... *F23J 11/00* (2013.01); *F23L 15/04* (2013.01); *F23J 2213/204* (2013.01); *Y10T 29/49826* (2015.01)

(58) Field of Classification Search
  CPC .................................................. F23J 2213/204
  USPC ..................... 126/307 R; 110/216; 29/428
  See application file for complete search history.

(56) References Cited

U.S. PATENT DOCUMENTS

| | | | |
|---|---|---|---|
| 3,580,226 A * | 5/1971 | Blackburn et al. | 122/235.11 |
| 3,605,776 A * | 9/1971 | Fullam | 137/14 |
| 3,860,224 A * | 1/1975 | Urich | C22B 1/2413 266/160 |
| 4,510,892 A | 4/1985 | Wincze et al. | |
| 4,648,353 A * | 3/1987 | Gohara | 122/4 D |
| 5,435,257 A * | 7/1995 | Wincze | 110/204 |
| 5,943,865 A * | 8/1999 | Cohen | 60/653 |
| 5,967,098 A * | 10/1999 | Tanca et al. | 122/4 D |
| 5,980,610 A * | 11/1999 | Huang et al. | 95/58 |
| 5,988,115 A * | 11/1999 | Anderson et al. | 122/4 D |
| 6,305,330 B1 * | 10/2001 | Darling | 122/4 D |
| 2004/0079925 A1 * | 4/2004 | Shouji et al. | 252/400.1 |
| 2005/0080310 A1 * | 4/2005 | Utkilen | B01D 53/22 585/818 |
| 2009/0293818 A1 * | 12/2009 | Kauppinen | 122/4 D |

FOREIGN PATENT DOCUMENTS

| | | |
|---|---|---|
| CN | 201526948 U | 7/2010 |
| JP | S576225 A | 1/1982 |
| JP | S5795503 A | 6/1982 |
| JP | S58156776 A | 9/1983 |
| JP | S6183822 A | 4/1986 |
| JP | H01217117 A | 9/1989 |

OTHER PUBLICATIONS

The First Office Action issued by the Chinese Patent Office dated Feb. 27, 2015 for Chinese Appln. No. 201310186442.5.

* cited by examiner

*Primary Examiner* — Avinash Savani
(74) *Attorney, Agent, or Firm* — GE Global Patent Operation

(57) ABSTRACT

A compensations duct assembly [100] is described that provides a gas tight connection between a backpass [9] of a furnace [3] and an air preheater pipe [10] having one end fixed relative to a floor. The compensation duct assembly [100] has an air preheater opening [133] that is connected to an air preheater duct [10]. A liquid seal [120] is employed to compensate for the movement due to thermal expansion between the backpass [9] and the compensation duct assembly [100]. The liquid seal [120] provides a gas tight connection under various conditions of thermal expansion.

20 Claims, 4 Drawing Sheets

WATER SEAL AT BACKPASS ECONOMIZER GAS OUTLET

BACKGROUND

The present disclosure generally relates to a furnace flue gas connection that adjusts to movement caused by expansion.

Various furnaces are used in industry to create power, incinerate waste or perform chemical processes. The flue gases are conveyed by interconnected flue gas ducts. These must maintain a gas-tight seal to prevent leakage of flue gases.

FIG. 1 shows flue gas ducts 1 from a conventional furnace 3 (partially shown). The flue gas ducts 1 include a top pass 7 starting above a nose 5 of the furnace 3 connecting to a backpass 9.

The backpass 9 extends downward to an economizer gas outlet duct 11. A backpass outlet manifold 12 attached to the economizer gas outlet duct 11. The backpass outlet manifold 12 includes an ash hopper 45 adapted to collect fly ash carried by the flue gases.

Support structures 37 extend over the furnace and flue gas ducts 1. The furnace 3 and flue gas ducts 1 typically are hung from the support structures 37 with hanger rods 39. The furnace 3 is typically fixed at its top left. When the backpass 9 and the flue gas ducts 1 expand, they move downward as shown by arrow "A" and to the right, as indicated by arrow "B".

An air preheater duct 10 extends vertically from the air preheater (not shown) that is secured to a floor. When air preheater duct 10 heats up, it expands upward in the direction shown by arrow "C". An elbow duct 19 is attached to the air preheater duct 10, which also moves upward as air preheater duct 10 expands. The motion due to thermal expansion causes the backpass outlet manifold 12 to become misaligned with the elbow duct 19.

Therefore a toggle section 13 is typically employed to adjust for the misalignment and movement due to thermal expansion. The toggle section 13 is designed to make a gas tight connection between the backpass outlet manifold 12 and the elbow duct 19. Since the expansions cause motion in the three directions indicated by arrows "A", "B" and "C", there should be some flexibility built into the toggle section 13.

Toggle section 13 includes expansion joints 15 on either side of a toggle duct 17. These are designed to adjust to the various movements of the ducts.

With the increase in size and power of furnaces and boilers, there is increased expansion requiring the toggle section 13 employed to become larger and heavier. These larger toggle sections 13 require additional support structures and make the system more expensive.

Reheater vertical tubes 41 support the reheaters 29 and economizer vertical tubes 43 support the economizers 33 in the backpass 9.

The fly ash and hopper 45 add considerable weight that must supported by the vertical tubes 41, 43, support structures 37 and hanger rods 39.

Since the toggle sections are getting larger with larger boilers, they require extra room, which results in a larger 'footprint'. This larger footprint also incurs increased costs.

Currently, there need for a device to provide a lighter, smaller, simpler, and less expensive gas-tight connection to connect misaligned flue gas ducts.

BRIEF SUMMARY

An embodiment of the present invention may be described as a compensation duct assembly [100] adapted to convey combustion flue gases from a backpass outlet [111] at a lower end of a backpass wall [129] to an air preheater duct [10] while compensating for thermal expansion. The device includes a connection duct [110] that is a flue gas conduit with a top side [151], a bottom side [153], a backpass end [155], an air preheater end [157], a connection duct upper opening [115] on a top side [151] of its backpass end [155], sized and shaped substantially the same as the backpass outlet [111] with an air preheater opening [133] at its air preheater end [157] on its bottom side [153] connected to the air preheater duct [10]. The compensation duct assembly [100] also employs a liquid seal [120] between the connection duct upper opening [115] of the connection duct [110] and the lower end of the backpass wall [129] acting to create a gas-tight seal between them.

The present invention may also be described as a method for creating a gas tight seal during thermal expansion between a backpass [9] of a furnace [3] and a relatively fixed duct 10, comprising the steps of:

providing a connection duct [110] being a flue gas conduit having an air preheater end, a backpass end a top side and a bottom side;

attaching the air preheater end of the connection duct [110] to said air preheater duct [10];

providing a liquid seal [120] at the topside of the backpass end of a connection duct [110]; and inserting a lower portion of the backpass [9] into the liquid seal [120] to result in a gas seal that compensates for movement due to thermal expansion.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
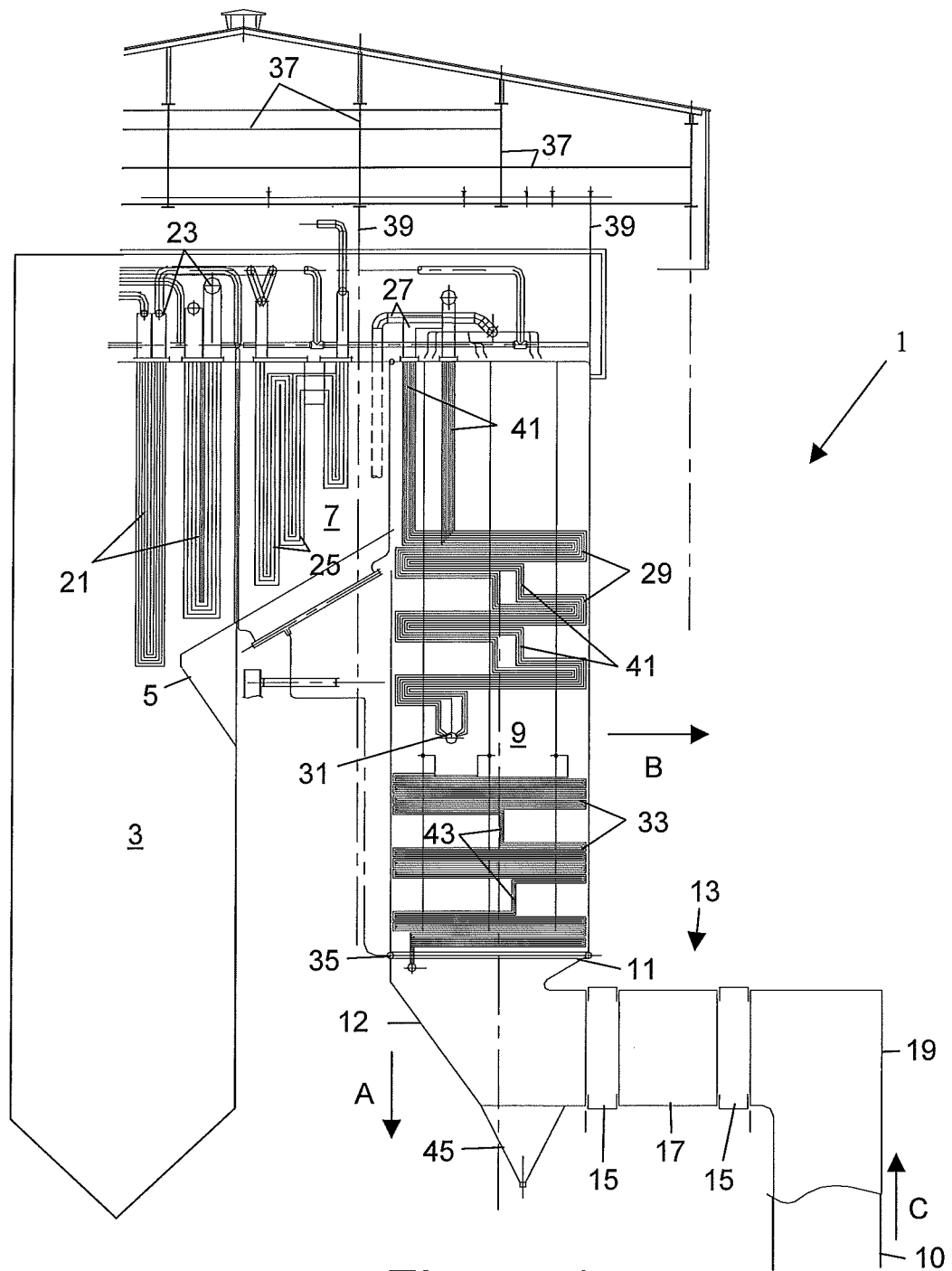
FIG. 1 is a side elevational view of conventional steam generator with backpass.

Referring now to FIG. 1, hot flue gases from the furnace 3 pass over super heaters 21 located in the top of the furnace and in a top pass 7. They receive steam and superheat the steam. The superheated steam is collected at the superheat headers 23. Similarly, steam enters the reheaters 25 in the top pass 7. There are also reheaters 29 and reheater headers 31 in a backpass 9. The backpass is lined with water tubes, but for clarity, are not shown here.

The lower backpass 9 has economizers 33 that receive feedwater, heat the feedwater. The heated feedwater is collected at a backpass lower ring header 35 and provide the heated feedwater to waterwalls of the furnace 3.

Typically, the top left of a furnace 3 is fixed to a stationary structure. When operating, the furnace 3 and flue gas ducts 1 expand to the right as indicated by arrow "B" and downward as indicated by arrow "C".

An elbow duct 19 is connected to the air preheater duct 10 that is connected to the air preheater that is fixed to the ground. Therefore, it can only expand upward, as shown by arrow "C".

The expansion, measured at the backpass lower ring header 35 can be typically 30.5 cm. (12 inches) down, 12.7 cm. (5 inches) rearward, and 6.4 cm. (2½ inches) out to the sides.

The toggle section 13 must be able to adjust for the relative movement between these ducts. Expansion joints 15 are on each side of toggle duct 17. These allow for the required adjustments.

The toggle section 13, as well as the ash hopper (with ash), economizer gas outlet duct 11, backpass 9, top pass 7 and furnace 3 are all suspended from hangar rods 39 which hang down from the support structure 37.

Therefore, the cost of the support structure 37 increases with the amount of weight it must support.

It would be useful to compensate for flue gas duct expansion at the interface with the air preheater duct 10 which does not necessitate the use of a toggle section 13.

The toggle section 13 tends to leak once the expansion becomes larger.

Figure 2:
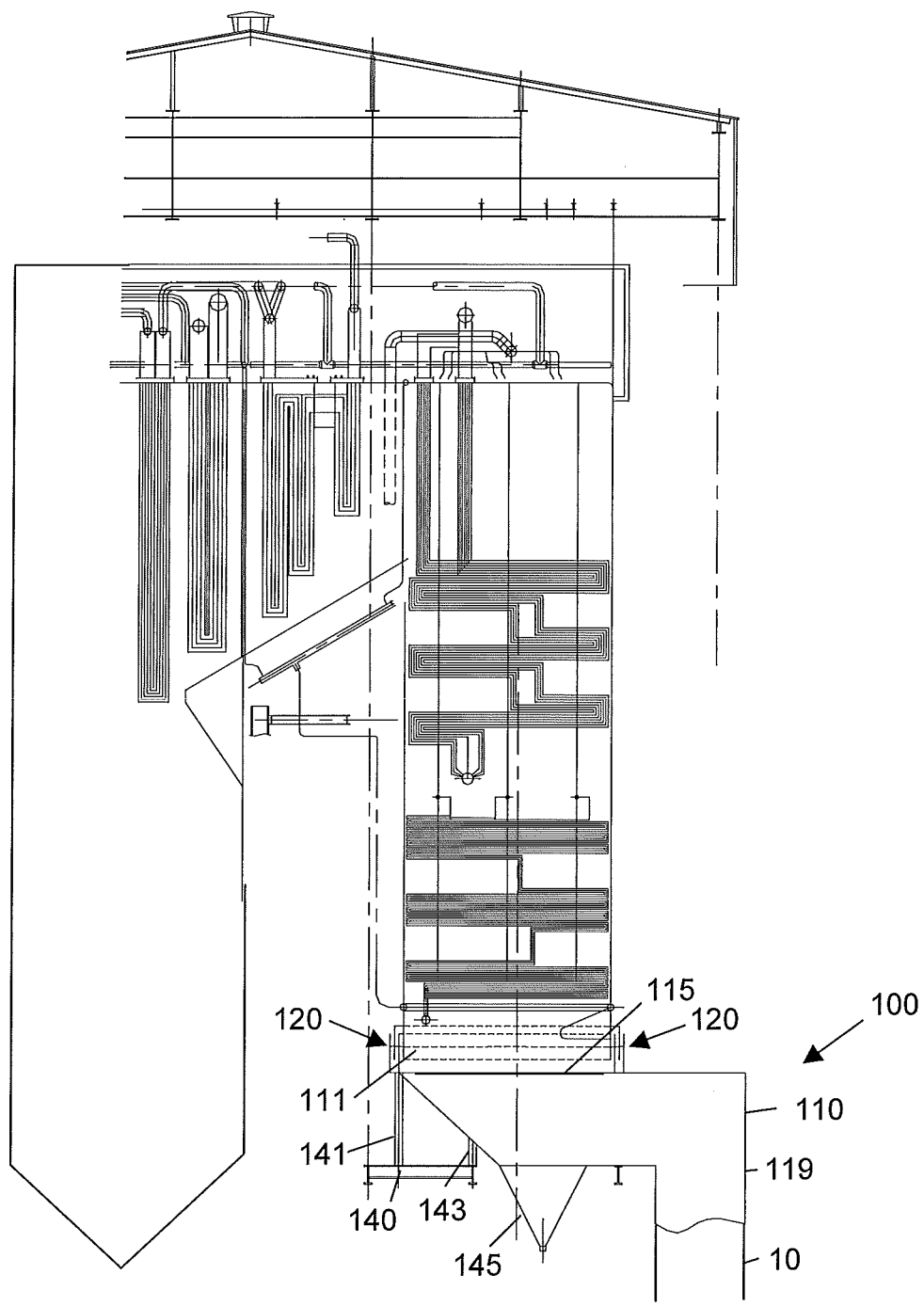
FIG. 2 is a side elevational view of a steam generator retrofitted with a flue gas connection according to one embodiment of the present invention.

Referring now to both FIGS. 1 and 2, the present invention eliminates the backpass outlet manifold 12, the toggle section 13 and the elbow duct 19 by replacing them with a compensation duct assembly 100. The compensation duct assembly 100 is secured to the air preheater duct 10.

There is no longer a toggle section 13, so the compensation duct assembly 100 does not float as did the backpass outlet manifold 12. Now all of the expansion motions are centralized at the interface of the bottom of the backpass 9 and the compensation duct assembly 100.

Compensation duct assembly 100 employs a liquid seal 120 which allows for horizontal motions in two dimensions as well as vertical motion, while maintaining a gas-tight seal.

Figure 3:
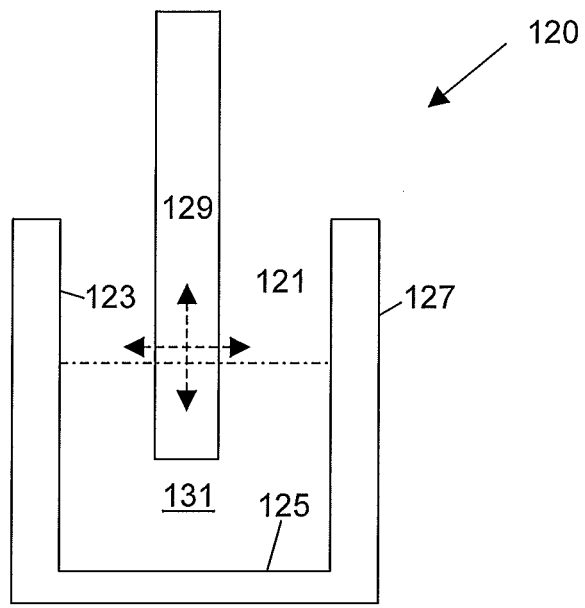
FIG. 3 is an enlarged side elevational view of a portion of the water seal according to an embodiment of the present invention.

FIG. 3 shows an enlarged view of a portion of the liquid seal 120.

The liquid seal 100 located below the backpass lower ring header 35. The liquid seal 120 can compensate for the expansion differential in all three directions. Here the backpass wall 129 on one side is shown. The backpass wall 129 is immersed in a trough 121 filled with a liquid 131, preferably water. The trough 121 has an inner wall 123, and outer wall 127 and a bottom 125. (It is assumed that the trough continues around the periphery defined by the backpass wall 129.) As shown by the arrows, the backpass wall 129 may move relative to the trough 121. However, if the trough is sufficiently long, wide and deep enough, there will be a gas-tight seal between the backpass 9 and the compensation duct assembly 100, even during expansion.

Figure 4:
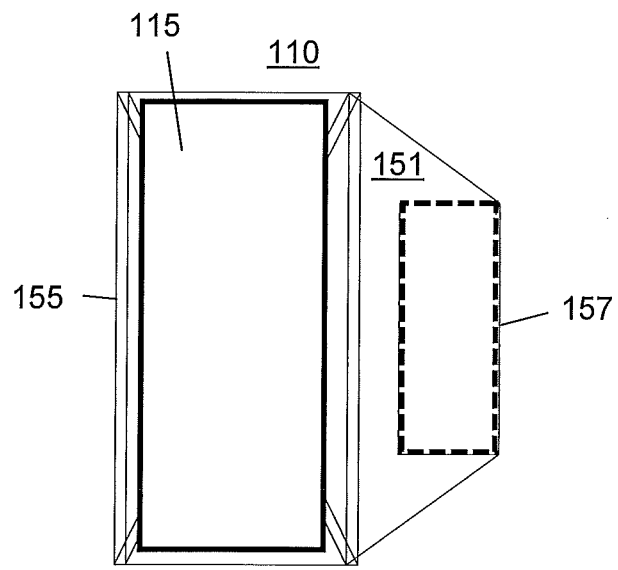
FIG. 4 is a plan view of the connection duct 110, from the top.

FIG. 4 is a plan view of the connection duct 110, from the top. Here the connection duct upper opening 115 is visible on the top side 151 at the backpass end 155. This is intended to connect, through the liquid seal, to the backpass (9 of FIG. 1).

Figure 5:
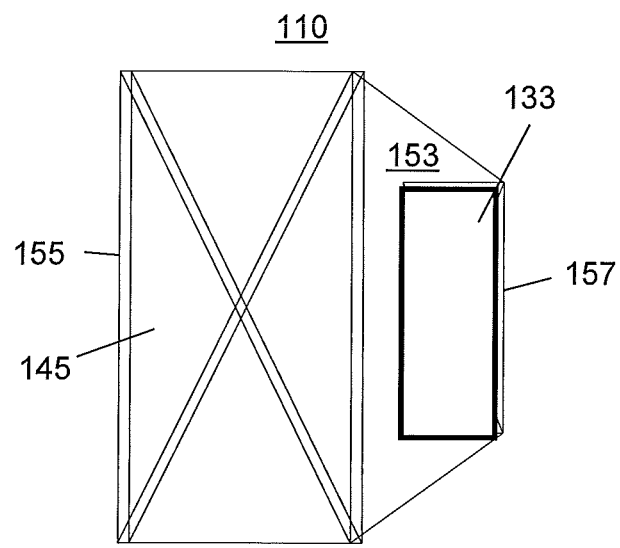
FIG. 5 is a plan view of the connection duct 110, from the bottom.

FIG. 5 is a plan view of the connection duct 110, from the bottom. This shows the bottom side 153 and the air preheater opening 133.

Figure 6:
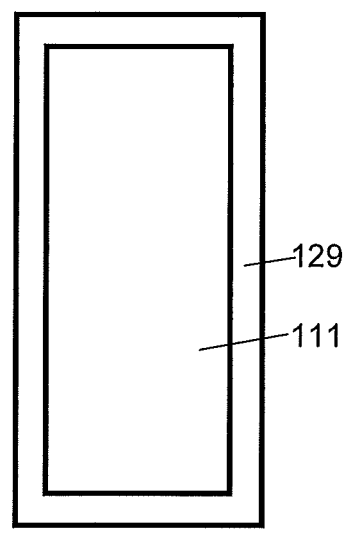
FIG. 6 is a plan view of the backpass, viewed from below.

FIG. 6 is a plan view of a lower section of the backpass (9 of FIG. 1), viewed from below. Here the backpass wall 129 and the back outlet 111 are visible.

An advantage of using a liquid seal 120 is that all of the weight of the compensation duct assembly 100, including the ash loading in the ash hopper 145 goes directly into the local duct supporting steel, rather than being transferred into the backpass pressure parts of the reheater 29, the economizer 33, especially the backpass lower ring header (35) and the backpass wall tubes (not numbered) and up to the support structure 37, as it is done in the prior art design. This would require heavier and thicker pipes, adding cost.

Another advantage of the present invention is that it would reduce the need for the toggle section 13 reducing the 'footprint' size, requiring less real estate resulting in a cost saving.

Another advantage is that all movement compensation is performed in the liquid seal 120. The other connections are now standard connections. Therefore, there is less probability of leaks and other irregularities.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compensation duct assembly adapted to convey combustion flue gases from a backpass to an air preheater adapted to compensate for thermal expansion; the compensation duct assembly comprising:
    a lower duct of the backpass extending downwardly having a lower opening end;
    an upper duct of the air preheater extending upwardly having an upper opening end, the upper duct of the air preheater having an annular trough formed around the periphery of the upper opening end thereof for retaining a liquid and receiving the lower opening end of the lower duct of the backpass to provide a liquid seal therebetween; and
    a floor support being a support fixed with respect to a floor, the floor support supporting the upper duct of the air preheater;
    wherein the backpass is supported from above by at least one hanger rod connected to a support structure.

2. The compensation duct assembly of claim 1, wherein the width of the trough is large enough to compensate for movement of the lower duct of the backpass or the upper duct of the air preheater in a horizontal plane to maintain the liquid seal.

3. The compensation duct assembly of claim 1, wherein the depth of the trough is large enough to compensate for movement of the lower duct of the backpass or the upper duct of the air preheater in a vertical direction to maintain the liquid seal.

4. The compensation duct assembly of claim 1, wherein the depth and width of the trough is large enough to compensate for thermal expansion of the lower duct of the backpass or the upper duct of the air preheater in a vertical direction to maintain the liquid seal.

5. The compensation duct assembly of claim 1 wherein the depth and width of the trough is large enough to compensate for movement of the lower duct of the backpass or the upper duct of the air preheater in a horizontal plane and a vertical direction to maintain the liquid seal.

6. The compensation duct assembly of claim 1, wherein the liquid comprises water.

7. A method of creating a gas tight seal during thermal expansion between a backpass of a furnace and an air preheater duct, comprising:
providing an annular trough formed around the periphery of an upper opening end of the air preheater duct;
filling the trough with a liquid;
immersing a lower opening end of the backpass in the liquid in the trough to form a liquid seal therebetween;
supporting the air preheater duct to a floor support being a support fixed with respect to a floor; and
supporting the backpass from above by at least one hanger rod connected to a support structure.

8. The method of claim 7, wherein the depth and width of the trough is large enough to compensate for thermal expansion of the lower opening end of the backpass or the upper opening end of the air preheater in a horizontal plane and in a vertical direction to maintain the liquid seal.

9. The compensation duct assembly of claim 1, wherein the trough is disposed around the outer periphery of the walls of the upper opening of the upper duct of the air preheater.

10. The compensation duct assembly of claim 1, wherein the shape of the trough and the lower opening of the lower duct of the backpass are similar.

11. The compensation duct assembly of claim 1, wherein the shape of the trough is rectangular.

12. The method of claim 7, wherein the width of the trough is large enough to compensate for movement of the lower opening end of the backpass or the upper opening end of the air preheater duct in a horizontal plane to maintain the liquid seal.

13. The method of claim 7, wherein the depth of the trough is large enough to compensate for movement of the lower opening end of the backpass or the upper opening end of the air preheater duct in a vertical direction to maintain the liquid seal.

14. The method of claim 7, wherein the depth and width of the trough is large enough to compensate for thermal expansion of the lower opening end of the backpass or the upper opening end of the air preheater duct in a vertical direction to maintain the liquid seal.

15. The method of claim 7 wherein the depth and width of the trough is large enough to compensate for movement of the lower opening end of the backpass or the upper opening end of the air preheater duct in a horizontal plane and a vertical direction to maintain the liquid seal.

16. The method of claim 7, wherein the liquid comprises water.

17. The method of claim 7, wherein the trough is disposed around the outer periphery of the walls of the upper opening end of the air preheater duct.

18. The method of claim 7, wherein the shape of the trough and the lower opening end of the backpass are similar.

19. The method of claim 7, wherein the shape of the trough is rectangular.

20. A compensation duct assembly adapted to convey combustion flue gases from a backpass to an air preheater adapted to compensate for thermal expansion; the compensation duct assembly comprising:
a lower duct of the backpass extending downwardly having a lower opening end;
an upper duct of the air preheater extending upwardly having an upper opening end, the upper duct of the air preheater having an annular trough formed around the periphery of the upper opening end thereof for retaining a liquid and receiving the lower opening end of the lower duct of the backpass to provide a liquid seal therebetween;
a floor support being a support fixed with respect to a floor, the floor support supporting the upper duct of the air preheater; and
an ash hopper fluidly connected to the lower duct of the backpass.

* * * * *